Jan. 2, 1940. M. M. CUNNINGHAM 2,185,246
BRAKE TESTER
Filed June 12, 1936 3 Sheets-Sheet 1

INVENTOR.
MARION M. CUNNINGHAM
BY A. E. Wilson
ATTORNEY.

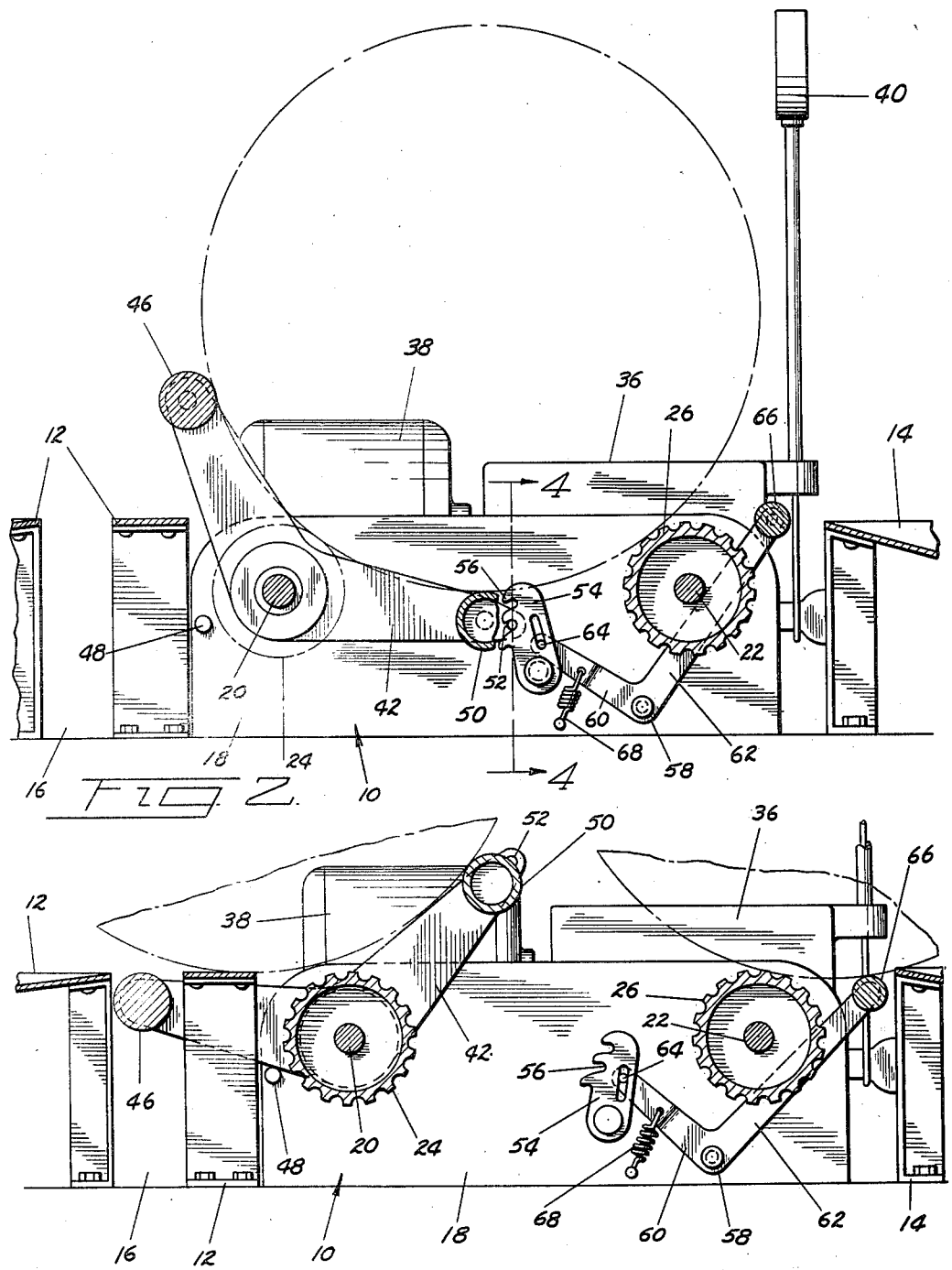

Jan. 2, 1940.  M. M. CUNNINGHAM  2,185,246
BRAKE TESTER
Filed June 12, 1936  3 Sheets-Sheet 3
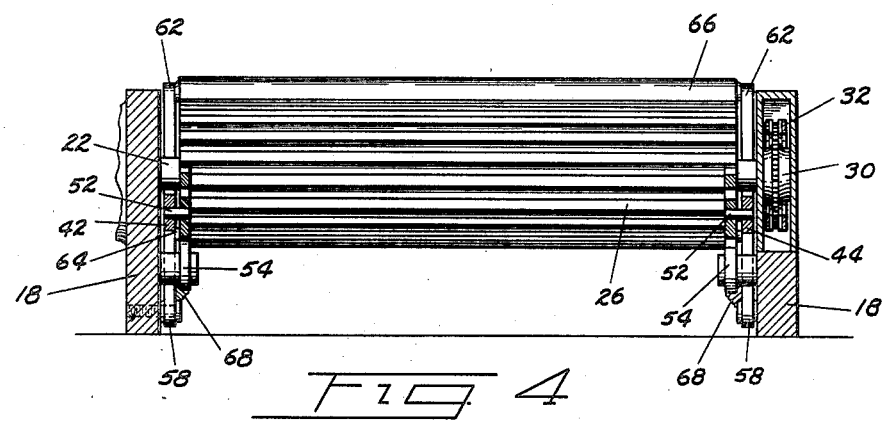
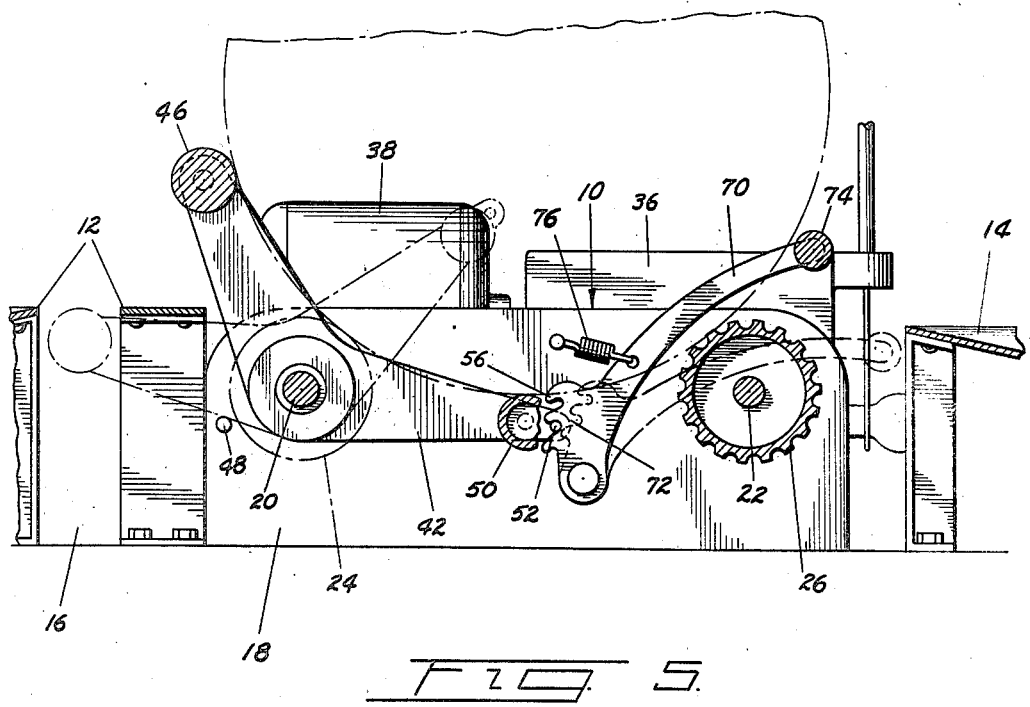
INVENTOR.
MARION M. CUNNINGHAM
BY
A. E. Wilson.
ATTORNEY.

Patented Jan. 2, 1940

2,185,246

UNITED STATES PATENT OFFICE 2,185,246

BRAKE TESTER

Marion M. Cunningham, South Bend, Ind., assignor to Bendix Products Corporation, South Bend, Ind., a corporation of Indiana Application June 12, 1936, Serial No. 84,933

8 Claims. (Cl. 73—51)

This invention relates to retaining devices, and more particularly to devices for retaining the wheels of a motor vehicle on a brake testing apparatus.

In a brake testing apparatus, including rollers for supporting and rotating a wheel against the resistance of its associated brake, it has been found necessary to provide some means for retaining the wheel upon the rollers during the testing operation. The present invention aims to supply this need.

An object of the invention is to provide means for retaining a wheel upon a rotating roller.

Another object of the invention is to provide an automatically operative wheel retaining device for use in combination with a brake testing apparatus.

Further objects and advantages of the invention reside in the various combinations hereinafter described and claimed.

In the drawings—

Fig. 2 is a sectional view substantially on the line 2—2 of Fig. 1, illustrating a vehicle wheel positioned on one of the testing units and held against displacement by the retaining apparatus;

Fig. 3 is a similar view illustrating the operation of the apparatus as the vehicle rolls onto and off of the brake testing unit;

Fig. 4 is a sectional view substantially on the line 4—4 of Fig. 2; and

Fig. 5 is a view similar to Fig. 2 showing a modified form of the retaining apparatus.

Figure 1:
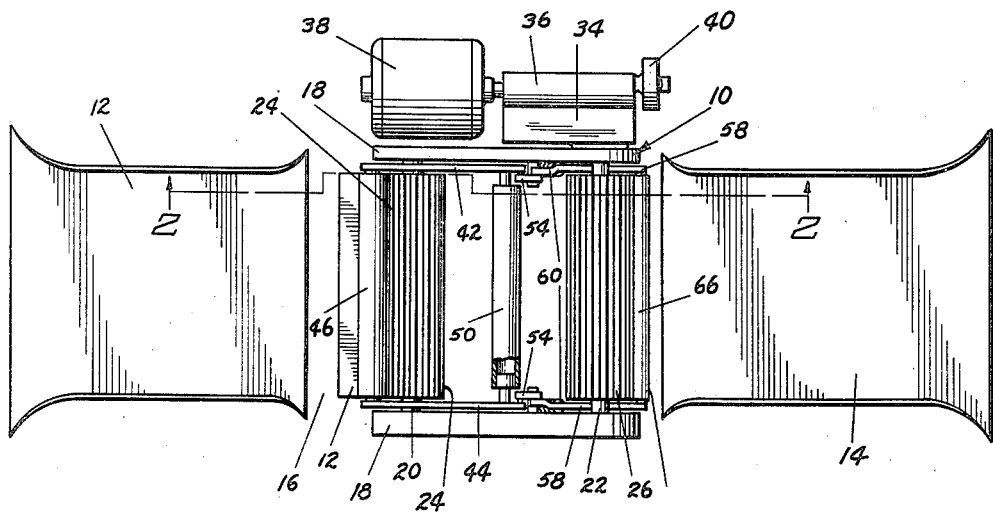
Fig. 1 is a top plan view of a brake testing machine embodying the invention.
Figure 1:
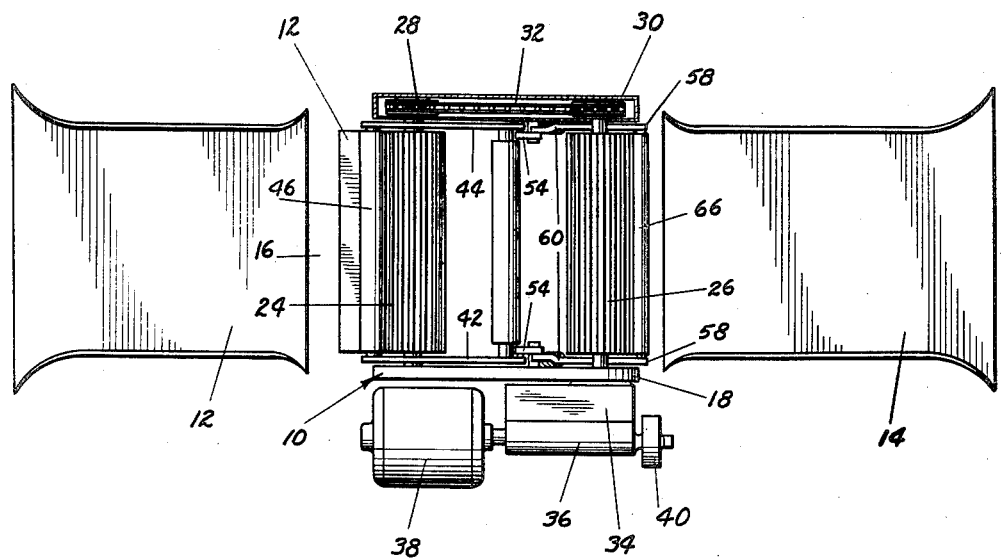

In order to simplify the description of the invention, an apparatus susceptible of carrying the same into effect is illustrated rather diagrammatically in the accompanying drawings. It will be appreciated, in view of the principles herein involved, that numerous diversifications and modifications in the actual structure will readily suggest themselves to those skilled in the art. As illustrated in the drawings, the invention may be embodied in a single unit for testing the brakes associated with an individual wheel, or a pair of corresponding oppositely disposed units arranged for simultaneously testing the brakes associated with a pair of oppositely disposed wheels.

A brake testing unit, indicated generally at 10, is preferably positioned between suitable ramps 12 and 14, one of which, the ramp 12, may be sectionalized and the sections spaced apart as indicated at 16, the purpose of which will hereinafter appear. It is, of course, to be understood that the brake testing unit may be suitably installed in a pit or mounted in any other manner found advantageous for the purpose of testing brakes.

Each brake testing unit includes a base 18 of any suitable structure, having journaled thereon shafts 20 and 22 arranged in spaced parallel relation to one another transversely of the base. Keyed or otherwise secured to the shafts are rollers 24 and 26, preferably ribbed longitudinally so as to increase friction between the roller and a vehicle wheel may be supported by the roller for rotation against the resistance of its associated brake.

One end of the shaft 20 has keyed thereto a sprocket wheel 28 and the corresponding end of the shaft 22 has keyed thereto a sprocket wheel 30, and a sprocket chain 32 connects the sprocket wheels so that rotary motion of one shaft may be transmitted to the other shaft. The other end of the shaft 22 is connected through a suitable transmission dynamometer 34 and suitable speed reduction mechanism 36 to a motor 38, and a gauge 40 is operatively connected to the dynamometer to indicate the torque imposed on the testing assemblage by the application of the brake of a given wheel.

In brake testing apparatus of this and similar types, it has been found necessary to provide some means for retaining the wheel on the apparatus while the brake associated with the wheel is undergoing test. Various devices have been developed for this purpose, but in so far as is known none have proved entirely satisfactory. The instant invention aims to overcome this difficulty by the provision of an effective restraining mechanism associated with each of the brake testing units and operative automatically by movement of the vehicle wheel onto and off of the apparatus.

As shown, the retaining mechanism includes corresponding bell crank levers 42 and 44 journaled respectively on the shaft 20 at opposite ends of the wheel supporting roller 24. A roller 46, preferably solid, is mounted for rotation on the coresponding arms of the bell crank levers 42 and 44 adjacent the approach of the brake testing unit. The weight of this roller is sufficient to normally retain the bell crank levers against stops 48 on the base 18, and when the levers are in this position the roller 46 rests in the space 16 between the respective sections of the ramp 12 with its periphery scarcely intersecting the tread of the ramp so that a vehicle wheel traveling over the ramp will not affect the retaining apparatus. The other arms of the bell crank levers 42 and 44 support for rotation a relatively light roller 50, and these arms have in their free ends corresponding latch pins 52.

The bell crank levers 42 and 44 swing the rollers 46 and 50 in arcuate paths around the wheel supporting roller 24. When the roller 46 is in its position of rest wherein the roller is located in the space 16 between the respective sections of the ramp 12, the roller 50 is in an elevated position above the wheel supporting roller 24. As a vehicle wheel, the brake of which is to undergo a test, rolls over the ramp 12 and onto the brake testing unit where it seats on the wheel supporting rollers 24 and 26, the roller 50 is moved by the wheel to a position intermediate the rollers 24 and 26, and during this movement the roller 46 is moved from its position of rest to an elevated position wherein it engages the periphery of the tire on the vehicle wheel and serves to retain the wheel against displacement during the brake testing operation.

The levers, and hence the rollers 46 and 50, are temporarily locked in this position by pawls 54 arranged for cooperation with the latch pins 52. As shown, the pawls 54 are pivoted on the base 18 and are of a selective type characterized by a plurality of teeth 56 for the reception of the latch pins 52, to the end that the bell crank levers may be retained in any one of a plurality of positions so as to compensate for variations in the diameters of vehicle wheels.

Bell crank levers 58, also pivoted on the base 18, have relatively short arms 60 and long arms 62. The short arms carry pins 64 received by slots in the pawls 54, and the long arms support for rotation a roller 66. Springs 68 connected between the arms 60 of the levers 58 and the base 18 normally retain the levers in such a position that the pins 64 on the arms 60 seat in the lower ends of the slots in the pawls 54. When the levers are in this position the pawls are retained in the path of the latch pins 52 or in engagement with the latch pins, and the roller 66 is in an elevated position above the wheel supporting roller 26.

Upon completion of the brake testing operation, the vehicle wheel, in moving from its seat between the wheel supporting rollers 24 and 26, engages and depresses the roller 66, resulting in tripping the pawls 54 and releasing the bell crank levers 42, whereupon these levers move to their normal positions under the influence of the weighted roller 46, and the apparatus is again in position for a subsequent operation.

A modification of the invention is illustrated in Fig. 5, wherein the selective pawls 54 are replaced by levers 70 pivoted on the base 18 of the brake testing unit. These levers have ratchets 72 adaptable for cooperation with the latch pins 52, and a roller 74 corresponding to the roller 66 is mounted between the free ends of the levers. Springs 76, connected between the levers and the base 18, normally retain the levers in an elevated position wherein the ratchets 72 are in the path of the latch pins 52 carried on the bell crank levers 42. The operation of this modification is precisely the same as the corresponding part of the preferred embodiment of the invention, and hence needs no explanation.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. In an apparatus of the class described, a brake testing unit including rollers for supporting and rotating a wheel against the resistance of its associated brake, a roller arranged to be swung into the path of the wheel for retaining the wheel on the rollers during rotation thereof, and means operated by the entry of a wheel upon said supporting rollers for swinging the retaining roller into operative position.

2. In an apparatus of the class described, a brake testing unit including rollers for supporting and rotating a wheel against the resistance of its associated brake, means for retaining the wheel against displacement during rotation thereof comprising a pair of oppositely disposed bell crank levers pivoted on the unit, rollers mounted for rotation on the levers and adapted to be alternately moved thereby into the path of the wheel, one of the rollers adapted to be struck by the wheel when the wheel moves onto the tester and thus move the other roller into wheel retaining position, means for locking the levers against movement, and means for unlocking the levers.

3. In an apparatus of the class described, a brake testing unit including rollers for supporting and rotating a wheel against the resistance of its associated brake, means for retaining the wheel against displacement during rotation thereof comprising a pair of oppositely disposed bell crank levers journaled on the shaft of one of the rollers for supporting and rotating the wheel, rollers supported for rotation on the levers and adapted to be moved thereby into the path of the wheel, catches for retaining the levers against movement in the wheel retaining position, and means for tripping the catches.

4. In an apparatus of the class described, a brake testing unit including rollers for supporting and rotating a wheel against the resistance of its associated brake, means for retaining the wheel against displacement during rotation thereof comprising a pair of oppositely disposed bell crank levers having their respective knees journaled on a shaft carrying one of the rollers for supporting and rotating the wheel, rollers mounted for rotation on the respective ends of the levers in the path of the wheel, latches for retaining the levers against movement in the wheel retaining position, and means in the path of the wheel for tripping the latches.

5. In an apparatus of the class described, a brake testing unit including rollers for supporting and rotating a wheel against the resistance of its associated brake, means for retaining the wheel against displacement during rotation thereof against the resistance of its associated brake comprising oppositely disposed bell crank levers having their respective knees journaled on a shaft carrying one of the rollers for supporting and rotating the wheel, a weighted roller mounted for rotation on corresponding ends of the levers, a light roller mounted for rotation on the other ends of the levers, catches for retaining the levers against movement in the wheel retaining position, and means for tripping the catches including a roller in the path of the wheel.

6. In an apparatus of the class described, a brake testing unit including rollers for supporting and rotating a wheel against the resistance of its associated brake, means for retaining the wheel on the rollers during rotation thereof comprising a cradle for the wheel rockable by movement of the wheel onto the unit, means for locking the cradle against movement, and means for unlocking the locking means operative by the wheel in moving off of the unit.

7. In a brake tester having rotatable means adapted to receive a vehicle wheel and wheel retaining means, means operated by the wheel for moving the retaining means into operative position and locking means to hold the wheel retaining means in operative position, and means operated by the wheel when the latter is moving off the rotatable means to release the locking means.

8. In an apparatus of the class described, a brake testing unit including rollers for supporting and rotating a wheel against the resistance of its associated brake, means arranged to be swung into the path of the wheel for retaining the wheel on the rollers during rotation thereof, and means operated by the entry of a wheel upon said supporting rollers for swinging the retaining means into operative position.

MARION M. CUNNINGHAM.